F. G. WHITTINGTON.
AUTOMOBILE BUMPER.
APPLICATION FILED NOV. 15, 1920.
1,381,377.
Patented June 14, 1921.
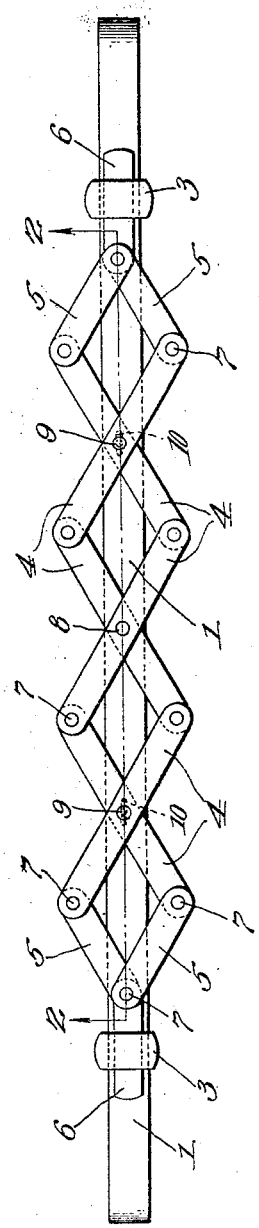
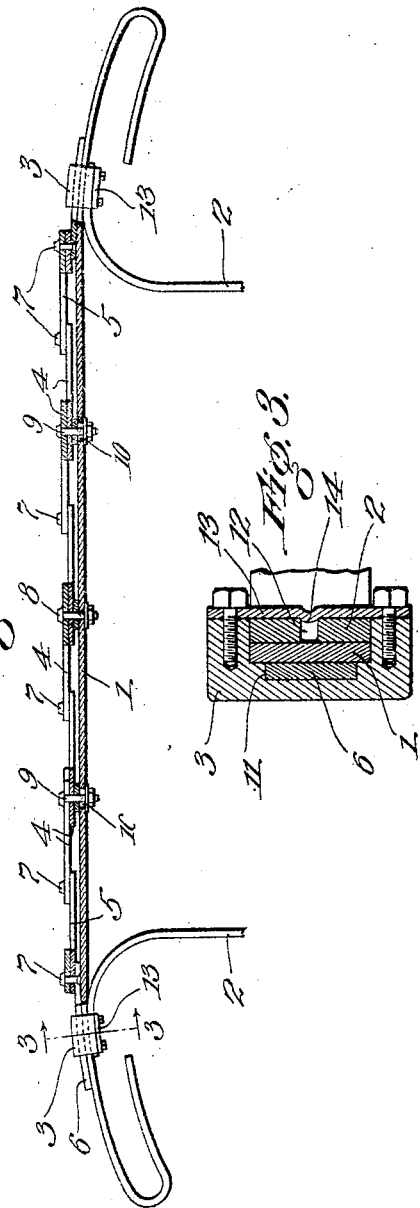
Inventor:
Frederik G. Whittington.

UNITED STATES PATENT OFFICE.

FREDERIK G. WHITTINGTON, OF CHICAGO, ILLINOIS, ASSIGNOR TO STEWART-WARNER SPEEDOMETER CORPORATION, OF CHICAGO, ILLINOIS, A CORPORATION OF VIRGINIA.

AUTOMOBILE-BUMPER.

1,381,377.  Specification of Letters Patent.  Patented June 14, 1921.

Application filed November 15, 1920. Serial No. 424,031.

*To all whom it may concern:*

Be it known that I, FREDERIK G. WHITTINGTON, a citizen of the United States, and a resident of the city of Chicago, in the county of Cook and State of Illinois, have invented certain new and useful Improvements in Automobile-Bumpers, of which the following is a specification, reference being had to the accompanying drawings, forming a part thereof.

The purpose of this invention is to provide an automobile bumper bar with supplemental impact means or members extending above and below the bar itself to engage projecting parts of other vehicles, particularly other bumper bars, which may be mounted either higher or lower than the main bar of the present device. It consists of the features and elements and their combination hereinafter described and shown in the drawings as indicated by the claims.

In the drawings:

Figure 1 is a front elevation of an automobile bumper embodying this invention.

Fig. 2 is a top plan view of the same taken partly in section as indicated at line 2—2 on Fig. 1.

Fig. 3 is a detail section of a clamp taken as indicated at line 3—3 on Fig. 2.

The bumper bar, 1, illustrated in the drawings is of somewhat conventional design arranged to be supported upon a vehicle frame by means of carrying arms 2—2. The arms, 2, are frictionally clamped to the bar, 1, by clamp fittings, 3, which may be adjusted laterally on the bar, 1, so as to accommodate the arms, 2, to a variety of frame widths. When a bumper of this type consisting simply of the parts 1, 2 and 3 is used alone, there is likelihood that a similar bumper or one of different design carried on another vehicle will be mounted either a little higher or a little lower so that as the vehicles approach the bumper bars will not engage each other but one will pass over the other and unless the vehicles are perfectly alined the bumper bars will not strike the tires but may do damage to other parts such as lamps or radiators.

The present invention therefore provides a set of supplemental impact members which are shown in Fig. 1 as short, flat bars, 4, extending obliquely across the impact bar, 1, so as to project above and below it. The bars, 4, are arranged in two sets, all the bars of each set being parallel to each other and the bars of the two sets being oppositely oblique with respect to the impact bar, 1. The grid or frame thus formed includes half-length members, 5, and terminal members, 6, at its ends; and by connecting all the bars together by means of pivots, 7, secured through their intersecting ends, and bolts, 8 and 9, at the intersecting mid-points of the bars, 4, the assembly constitutes a "pantograph" arrangement of adjustable length and somewhat variable width. This pantograph frame is mounted on the face of the impact bar, 1, by engagement of its terminal members, 6, in the clamp fittings, 3, and also by engagement of the bolts, 8 and 9, in apertures in the impact bar, 1. The bolt, 8, occupies a fixed position at the mid-point of the bar, 1, while the bolts, 9, are accommodated in slots, 10, which permit a limited range of movement corresponding to the range in adjustment of length of the pantograph frame as may be desired. It will be understood that such adjustment in length will be made primarily to permit adjustment in the position of the clamps, 3, as the carrying arms, 2, are accommodated to the width of the particular vehicle on which the bumper is mounted.

On account of their short length and in view of their arrangement, the supplemental impact members, 4 and 5, need not be of as heavy stock as the main impact bar, 1, and are shown as somewhat narrower. The clamp member, 3, is accordingly formed with a recess, 11, of just sufficient width to accommodate the terminal members, 6, which are of the same stock as the members, 4 and 5, and the recess, 11, also serves to center said members, 6, with respect to the bar, 1. For more positively positioning the clamp with respect to the end of the carrying arm, 2, with which it should be always associated, said arm may be formed with an aperture, 12, and the clamping plate, 13, of the clamp, 3, may have a slight boss, 14, formed to engage in the aperture, 12, as shown in Fig. 3.

I claim :—

1. In combination with a bumper bar, a plurality of supplemental impact members extending obliquely across the bar with their ends projecting above and below it, said members being connected to each other at such projecting ends; and means for securing said members on the bar.

2. In combination with a bumper bar, two sets of supplemental impact members disposed respectively in oppositely oblique relation to said bar extending across the same with their ends projecting above and below it, the ends of one set being connected respectively to the ends of the other set to form a frame or grid of greater height than the bar itself.

3. In the combination defined in claim 2 the impact members of each set being parallel to each other.

4. In the combination defined in claim 2 the ends of said impact members being pivotally connected together and the members of one set being lapped across the members of the other set and pivoted thereto at their overlapping portions.

5. In combination with a bumper bar and supporting arms therefor with laterally separated clamps on said bar by which it is secured to the arms, a plurality of supplemental impact members extending obliquely across the bar with their end portions projecting above and below it to form a frame or grid of greater height than the bar itself, said frame including laterally extending terminal members secured by the said clamps for supporting the frame in proper relation to the bar.

6. In combination with a bumper bar and supporting arms therefor with laterally separated clamps on said bar by which it is secured to the arms, a frame or grid of greater height than the bar itself composed of two sets of supplemental impact members disposed respectively in oppositely oblique relation to said bar extending across the same with their ends projecting above and below it, the ends of one set being connected respectively to the ends of the other set together with terminal members connected to the ends of the said frame and engaged respectively by said clamps.

7. In the combination defined in claim 6, said clamps and supporting arms being laterally adjustable upon the bumper bar, the ends of the supplemental impact members being pivotally connected together and the members of one set being also pivoted to the members of the other set at their overlapping portions whereby the frame is adjustable in length to correspond with adjustment in the distance between the clamps.

8. In the combination defined in claim 6 the said impact members being all of the same length and the frame including at each end a terminal member and a pair of half-length impact members pivoted thereto and diverging for pivotal connection with the ends of the full-length impact members above and below the bar respectively, the connections between said full-length members being pivotal and said members being also pivoted together in pairs at their overlapping portions to form a pantograph adapted for adjustment to fit between the clamps on the bar.

9. In the combination defined in claim 8, said frame having a pivot which connects a pair of overlapping impact members and also engages the bumper bar fixedly at its mid-point.

10. In combination with a bumper bar, two sets of supplemental impact members disposed respectively in oppositely oblique relation to said bar extending across the same with their ends projecting above and below it, the ends of one set being pivoted respectively to the ends of the other set and pivots connecting the overlapping portions of said members between their ends, said pivots extending also through the bumper bar for securing the supplemental members thereto.

11. In the combination defined in claim 10, one of said pivots engaging the bumper bar at its mid-point and the other pivots extending through slots in the bar and being provided with clamping nuts to hold them in adjusted position in said slots.

12. In combination with a bumper bar and supporting arms therefor, a two-part clamp for securing each of said arms to the bar, one member of said clamp being formed for sliding adjustment along the bar, the end of the supporting arm having a recess or aperture and the other member of the clamp being formed with a boss to engage said aperture for positioning the clamp on the arm.

13. In combination with a bumper bar and supporting arms therefor with clamps adjustable longitudinally on the bumper bar for securing it to said arms, supplemental impact means comprising a pantograph frame with terminal lugs extending for engagement under said clamps and with pivots at the intersections of its members extending through apertures in the bumper bar for additional securement of said frame thereto.

In testimony whereof I have hereunto set my hand this 10th day of November, 1920.

FREDERIK G. WHITTINGTON.